(12) United States Patent
Okawa et al.

(10) Patent No.: US 7,488,429 B2
(45) Date of Patent: Feb. 10, 2009

(54) METHOD OF DRY ETCHING, METHOD OF MANUFACTURING MAGNETIC RECORDING MEDIUM, AND MAGNETIC RECORDING MEDIUM

(75) Inventors: Shuichi Okawa, Tokyo (JP); Kazuhiro Hattori, Tokyo (JP); Mikiharu Hibi, Tokyo (JP); Mitsuru Takai, Tokyo (JP)

(73) Assignee: TDK Corporation, Tokyo (JP)

( * ) Notice: Subject to any disclaimer, the term of this patent is extended or adjusted under 35 U.S.C. 154(b) by 336 days.

(21) Appl. No.: 11/156,469

(22) Filed: Jun. 21, 2005

(65) Prior Publication Data

US 2005/0284842 A1    Dec. 29, 2005

(30) Foreign Application Priority Data

Jun. 28, 2004 (JP) .............................. 2004-190061

(51) Int. Cl.
*B44C 1/22* (2006.01)
*G11B 5/82* (2006.01)
*G11B 5/65* (2006.01)
*C03C 15/00* (2006.01)
*C03C 25/68* (2006.01)
*C23F 1/00* (2006.01)

(52) U.S. Cl. .................... 216/22; 216/41; 360/135; 428/835

(58) Field of Classification Search .................. None
See application file for complete search history.

(56) References Cited

U.S. PATENT DOCUMENTS

| 5,240,554 | A | * | 8/1993 | Hori et al. ............... 438/702 |
| 5,378,316 | A | * | 1/1995 | Franke et al. .............. 216/2 |
| 5,789,320 | A | * | 8/1998 | Andricacos et al. ........ 438/678 |
| 5,910,864 | A | * | 6/1999 | Hira et al. .............. 360/235.9 |
| 5,991,118 | A | * | 11/1999 | Kasamatsu et al. ....... 360/236.6 |
| 6,014,296 | A | | 1/2000 | Ichihara et al. |
| 6,324,032 | B1 | * | 11/2001 | Ohtsuka et al. ............. 360/131 |
| 6,348,405 | B1 | * | 2/2002 | Ohuchi ....................... 438/636 |
| 6,383,907 | B1 | * | 5/2002 | Hasegawa et al. .......... 438/597 |
| 6,689,622 | B1 | * | 2/2004 | Drewes ....................... 438/3 |
| 6,748,865 | B2 | * | 6/2004 | Sakurai et al. .............. 101/483 |
| 6,806,096 | B1 | * | 10/2004 | Kim et al. ................. 438/3 |
| 6,875,664 | B1 | * | 4/2005 | Huang et al. ............... 438/299 |

(Continued)

FOREIGN PATENT DOCUMENTS

JP    A-60-047422    3/1985

(Continued)

*Primary Examiner*—Allan Olsen
(74) *Attorney, Agent, or Firm*—Oliff & Berridge, PLC

(57) ABSTRACT

The recording layer (to-be-etched layer), a main mask layer, and a sub mask layer are formed in this order over a substrate, and the sub mask layer is processed into a predetermined concavo-convex pattern. Next, parts of the main mask layer under the concave portions are removed by reactive ion etching using oxygen or ozone as the reactive gas. Parts of the recording layer under the concave portions are also removed by dry etching, whereby the recording layer is shaped into the concavo-convex pattern. The main mask layer is chiefly made of carbon. The sub mask layer is made of a material having an etching rate lower than that of carbon with respect to the reactive ion etching in the step of processing the main mask layer.

20 Claims, 7 Drawing Sheets

U.S. PATENT DOCUMENTS

| | | | | |
|---|---|---|---|---|
| 6,884,630 | B2* | 4/2005 | Gupta et al. | 438/3 |
| 6,884,733 | B1* | 4/2005 | Dakshina-Murthy et al. | 438/717 |
| 6,977,108 | B2* | 12/2005 | Hieda et al. | 428/64.2 |
| 6,984,529 | B2* | 1/2006 | Stojakovic et al. | 438/3 |
| 6,989,332 | B1* | 1/2006 | Bell et al. | 438/719 |
| 7,050,326 | B2* | 5/2006 | Anthony | 365/158 |
| 2003/0164354 | A1* | 9/2003 | Hsieh et al. | 216/22 |
| 2004/0016918 | A1* | 1/2004 | Amin et al. | 257/14 |
| 2004/0191577 | A1* | 9/2004 | Suwa et al. | 428/694 TP |
| 2004/0224512 | A1* | 11/2004 | Sato et al. | 438/689 |
| 2004/0229470 | A1* | 11/2004 | Rui et al. | 438/710 |
| 2004/0259355 | A1* | 12/2004 | Yin et al. | 438/689 |
| 2005/0112506 | A1* | 5/2005 | Czech et al. | 430/322 |
| 2005/0118817 | A1* | 6/2005 | Fujita et al. | 438/689 |
| 2005/0157376 | A1* | 7/2005 | Huibers et al. | 359/291 |
| 2005/0175791 | A1* | 8/2005 | Hattori et al. | 427/548 |
| 2005/0181604 | A1* | 8/2005 | Sperlich et al. | 438/671 |
| 2005/0213239 | A1* | 9/2005 | Hibi et al. | 360/48 |
| 2005/0214583 | A1* | 9/2005 | Ito et al. | 428/800 |
| 2005/0221512 | A1* | 10/2005 | Ito et al. | 438/3 |
| 2005/0243467 | A1* | 11/2005 | Takai et al. | 360/135 |
| 2005/0284842 | A1* | 12/2005 | Okawa et al. | 216/22 |
| 2005/0287397 | A1* | 12/2005 | Soeno et al. | 428/831 |
| 2006/0046200 | A1* | 3/2006 | Abatchev et al. | 430/313 |
| 2006/0065286 | A1* | 3/2006 | Rana et al. | 134/1.2 |
| 2007/0161251 | A1* | 7/2007 | Tran et al. | 438/725 |

FOREIGN PATENT DOCUMENTS

| | | |
|---|---|---|
| JP | A-62-247522 | 10/1987 |
| JP | A-62-293721 | 12/1987 |
| JP | A-02-143413 | 6/1990 |
| JP | 06020230 A * | 1/1994 |
| JP | A-09-097419 | 4/1997 |
| JP | A-2000-322710 | 11/2000 |
| JP | 2001185531 A * | 7/2001 |

* cited by examiner

METHOD OF DRY ETCHING, METHOD OF MANUFACTURING MAGNETIC RECORDING MEDIUM, AND MAGNETIC RECORDING MEDIUM

BACKGROUND OF THE INVENTION

1. Field of the Invention

The invention relates to a method of dry etching for processing the surface of an object to be processed into a concavo-convex pattern, a method of manufacturing a magnetic recording medium by using the same, and a magnetic recording medium having a recording layer formed in a concavo-convex pattern.

2. Description of the Related Art

Conventionally, in the fields of semiconductors and the like, dry etching has been widely used for processing the surface of an object to be processed into a concavo-convex pattern. In the field of information recording media, there have also been the needs to process the surface of an object to be processed into a concavo-convex pattern. For the purpose of this processing, the use of dry etching has thus been expected.

For example, magnetic recording media such as a hard disk have made significant growths in areal density through such improvements as finer magnetic particles to constitute the recording layers, modifications of materials, and finer head processing. Further enhancement of the areal density in the future is also expected. Nevertheless, the enhancement of the areal density with conventional improvement techniques is approaching its limit as the advent of such problems as limitations in the head processing, accidental recording of information onto other tracks adjacent to an intended track due to spreading magnetic fields, and crosstalk. In view of this, there have been proposed such magnetic recording media as a discrete track medium and a patterned medium (for example, see Japanese Patent Laid-Open Publication No. Hei 9-97419) as candidates for magnetic recording media that are capable of further enhancement in areal density. In these media, the recording layer is formed in a predetermined concavo-convex pattern so that the convex portions constitute recording elements. It is then expected to use dry etching in order to process the recording layer into a concavo-convex pattern.

Among the dry etching techniques available for processing the recording layer, made of a magnetic material, into a concavo-convex pattern is reactive ion etching in which CO (carbon monoxide) gas having a nitrogen-containing gas such as $NH_3$ (ammonia) gas added thereto is used as the reactive gas (for example, see Japanese Patent Laid-Open Publication No. Hei 12-322710). To process the recording layer (to-be-etched layer) by dry etching, a mask layer must be processed into the concavo-convex pattern. The mask layer, in turn, can also be processed by using a dry etching technique. For example, a resist layer is formed on the mask layer, and the resist layer is processed into a concavo-convex pattern by a lithographic method or the like which is used in the field of semiconductors. Then, the mask layer can be processed into the concavo-convex pattern by removing parts of the mask layer under the concave portions by dry etching. Alternatively, the resist layer may be formed on the mask layer with another mask layer interposed therebetween. These mask layers can be dry etched from the resist-layer side in succession to process the mask layer lying on the to-be-etched layer into the concavo-convex pattern.

The to-be-etched layer can be surely processed into a predetermined concavo-convex pattern by dry etching. It is difficult, however, to shape the sides 102A of the convex portions 102 of the to-be-etched layer 100 generally perpendicular to the surface as shown in FIG. 12. In fact, as shown in FIG. 13, the sides 102A are processed into tapered shapes tilting toward the surface, thereby causing a difference between the intended shape and the actually-processed shape. More specifically, in the dry etching as shown in FIG. 13, some of the processing gas approaches the object to be processed with slight tilts from the perpendicular direction. Consequently, even if the edges of the to-be-etched areas of the to-be-etched layer 100 are exposed from the mask 104, they are hidden under the mask 104 from some of the processing gas. Those areas can thus be etched slower than the other areas, seemingly contributing to the tapered shapes of the sides 102A.

Moreover, since the mask layer is also processed by dry etching as mentioned above, its convex portions are also shaped into tapered sides. As a result, the concavo-convex pattern of the resist layer and the mask layer on the surface side is transferred to the to-be-etched layer with gradual increases in the convex portion widths. The greater the taper angle of the sides of the convex portions of the mask layer is, the lower precision the concavo-convex pattern is transferred to the to-be-etched layer with. Furthermore, if the taper angle of the sides of the convex portions of the mask layer is too large, V-shaped grooves having continuous sides may be formed on the to-be-etched layer. This sometimes limits the progress of etching, failing to process into a desired depth. For example, in the above-mentioned magnetic recording media such as a discrete medium and a patterned medium, it is sometimes impossible to divide the recording layer due to the formation of V grooves shallower than the thickness of the recording layer.

As the pattern to be etched becomes finer, the difference between the intended shape and the actually-processed shape tends to have a relatively higher impact on the characteristics of the products. For example, in such magnetic recording media as a discrete track medium and a patterned medium, the recording elements approach each other when the sides of the recording elements are processed into tapered shapes. This facilitates the problem of accidental recording of information onto other tracks adjacent to the intended track and the problem of crosstalk, thereby deteriorating the magnetic characteristics. This has given rise to a demand for a method of dry etching capable of processing the surface of the object to be processed into a concavo-convex pattern so that the sides of the convex portions are shaped generally perpendicular to the surface.

Incidentally, such magnetic recording media as a discrete track medium and a patterned medium may deteriorate in magnetic characteristics when the recording elements are exposed to the processing gas during processing or exposed to the air after the processing. Then, a method of dry etching capable of protecting the surface of the object to be processed while processing the surface of the object to be processed into a concavo-convex pattern has also be demanded.

Now, suppose that reactive ion etching is performed as the dry etching for processing the mask layer into a concavo-convex pattern, and the mask layer keeps being processed even after the mask layer is processed up to the bottom. Here, the side areas of the convex portions of the mask layer can be surely removed to reduce the width of the convex portions of the mask layer and the taper angle of the sides. Processing the mask layer thus longer, however, requires that the other mask layers and resist layers to be formed thereon be made accordingly thicker. The resist layer formed thicker may sometimes cause deformation or collapse of its convex portions, with a drop in the processing accuracy instead.

Considering that the sides of the convex portions of the mask layer are processed into tapered shapes, the outermost mask layer or resist layer may be provided with a concavo-convex pattern having convex portions narrower than those of the intended concavo-convex pattern of the to-be-etched layer. This can make it possible to process the to-be-etched layer into the desired etching pattern. Nevertheless, if the concavo-convex pattern has smaller pitches, the outermost mask layer or resist layer must have convex portions of excessively smaller widths. This sometimes facilitates deformation or collapse of the convex portions, or even makes it difficult to form the convex portions.

SUMMARY OF THE INVENTION

In view of the foregoing problems, various exemplary embodiments of this invention provide a method of dry etching capable of processing a to-be-etched layer into a desired concavo-convex pattern with high precision, a method of manufacturing a magnetic recording medium by using the same, and a magnetic recording medium having a recording layer formed in a concavo-convex pattern so that favorable magnetic characteristics are obtained with reliability.

Various exemplary embodiments of the invention provide the steps of: forming a main mask layer chiefly made of carbon and a sub mask layer in this order over a to-be-etched layer; processing the sub mask layer into a predetermined concavo-convex pattern; removing parts of the main mask layer under concave portions of the concavo-convex pattern by reactive ion etching using at least either one of oxygen and ozone as a reactive gas; and then removing parts of the to-be-etched layer under the concave portions of the concavo-convex pattern, thereby shaping the to-be-etched layer into the concavo-convex pattern.

By the reactive ion etching using oxygen or ozone as the reactive gas, carbon can be processed in a short time. This makes it possible to reduce the thicknesses of the sub mask layer and a resist layer lying over the main mask layer which is chiefly made of carbon. Since the sub mask layer and the resist layer have smaller thicknesses, the taper angle of the sides of the convex portions of the main mask layer itself can be suppressed smaller. Consequently, the concavo-convex pattern of the resist layer and the sub mask layer can be transferred to the main mask layer and the to-be-etched layer with high precision.

Moreover, by using ion beam etching in which a processing gas has high directivity as a dry etching to process the to-be-etched layer, the sides of the convex portions of the to-be-etched layer can thus be shaped generally perpendicular to the surface. Here, since carbon has a low etching rate with respect to the ion beam etching, the main mask layer can be made accordingly thinner. Even in this respect, the sides of the convex portions of the to-be-etched layer can be shaped generally perpendicular to the surface.

When an intermediate layer is formed between the to-be-etched layer and the main mask layer, it is possible to protect the top surfaces of the convex portions of the to-be-etched layer from the processing of removing the main mask layer.

Various exemplary embodiments of the invention provide a magnetic recording medium which comprises: a substrate; a recording layer formed in a concavo-convex pattern over the substrate, having recording elements formed as convex portions of the concavo-convex pattern; a nonmagnetic filler filled into between the recording elements; a nonmagnetic intermediate layer covering the top surfaces of the recording elements; and a protective layer covering the top surfaces of the intermediate layer and the filler. Here, the intermediate layer and the protective layer are made of different materials.

As described above, the intermediate layer and the protective layer are made of different materials. Thus, even if a crack or the like occurs in either one of the layers, it is less likely to propagate to the other. Consequently, even after the processing, the recording layer is surely isolated from the air and the like so that favorable magnetic characteristics are obtained with reliability.

Accordingly, various exemplary embodiments of the invention provide
a method of dry etching, comprising:
a mask layer forming step of forming a main mask layer and a sub mask layer in this order over a to-be-etched layer;
a sub mask layer processing step of processing the sub mask layer into a predetermined concavo-convex pattern;
a main mask layer processing step of removing parts of the main mask layer under concave portions of the concavo-convex pattern by reactive ion etching using at least either one of oxygen and ozone as a reactive gas; and
a to-be-etched layer processing step of removing parts of the to-be-etched layer under the concave portions of the concavo-convex pattern by dry etching, thereby shaping the to-be-etched layer into the concavo-convex pattern, wherein
the main mask layer is chiefly made of carbon, and
the sub mask layer is made of a material having an etching rate lower than that of the material of the main mask layer with respect to the reactive ion etching in the main mask layer processing step.

Alternatively, various exemplary embodiments of the invention provide
a magnetic recording medium comprising:
a substrate;
a recording layer formed in a concavo-convex pattern over the substrate, having recording elements formed as convex portions of the concavo-convex pattern;
a nonmagnetic filler filled into concave portions between the recording elements;
an intermediate layer covering top surfaces of the recording elements; and
a protective layer covering the top surfaces of the intermediate layer and the filler, wherein
the intermediate layer and the protective layer are made of different materials.

Incidentally, as employed in this application, the term "etching rate" shall refer to the speed at which an area of a layer to be processed, such as the to-be-etched layer, the mask layers, and the intermediate layer, where its surface is generally parallel to the substrate surface is processed per unit time in the direction perpendicular to the substrate surface.

Moreover, as employed herein, the "recording layer having recording elements formed as convex portions of a concavo-convex pattern" shall refer not only to one obtained by dividing a continuous recording layer into a number of recording elements in the predetermined concavo-convex pattern. The phase shall also cover any of the following: a recording layer in which a continuous recording layer is partly divided to a predetermined pattern and partly made of a continuous recording element; a recording layer which is continuously formed on part of the substrate, such as a magnetic recording layer of spiral configuration; and a continuous recording layer which is provided with both convex portions and concave portions, and recording elements are formed as the convex portions.

Moreover, as employed herein, the term "magnetic recording medium" shall not be limited to a hard disk, a floppy™ disk, a magnetic tape, and the like on/from which information is recorded and read by means of magnetism alone, but also refer to a magneto-optic recording medium using both magnetism and light, such as an MO (Magneto Optical), and a recording medium of thermal assisted type using both magnetism and heat.

According to various exemplary embodiments of the present invention, it is possible to process a to-be-etched layer into a desired concavo-convex pattern with high precision. In addition, the convex portions of the to-be-etched layer can be protected from the processing gases and the air.

DETAILED DESCRIPTION OF THE PREFERRED EMBODIMENT

Various exemplary embodiments of this invention will be hereinafter described in detail with reference to the drawings.

Figure 1:
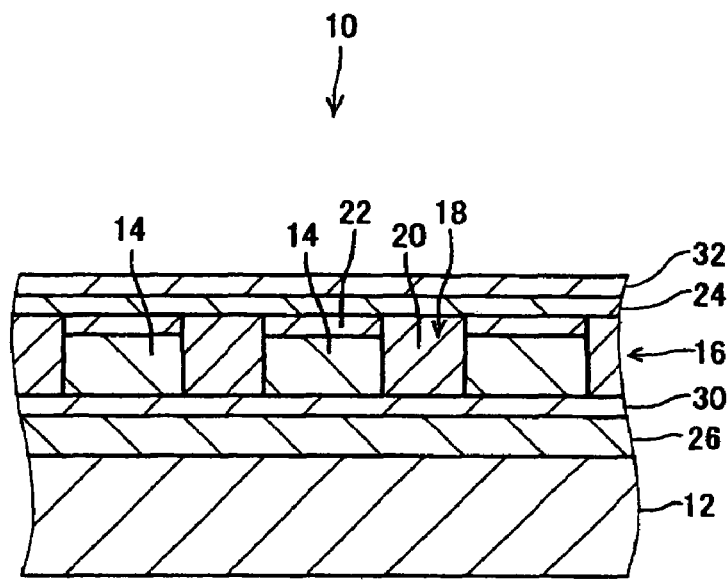
FIG. 1 is a sectional side view schematically showing the structure of a magnetic recording medium according to an exemplary embodiment of the present invention.

A magnetic recording medium 10 according to the present exemplary embodiment is a disk-shaped discrete track medium of longitudinal recording type. As shown in FIG. 1, the magnetic recording medium 10 has a substrate 12, a recording layer 16, a nonmagnetic filler 20, a nonmagnetic intermediate layer 22, and a protective layer 24. The recording layer 16 is formed in a concavo-convex pattern over the substrate 12. The convex portions of the concavo-convex pattern make recording elements 14. The filler 20 is filled into the concave portions 18 between the recording elements 14. The intermediate layer 22 covers the top surfaces of the recording elements 14. The protective layer 24 covers the top surfaces of the intermediate layer 22 and the filler 20.

Figure 2:
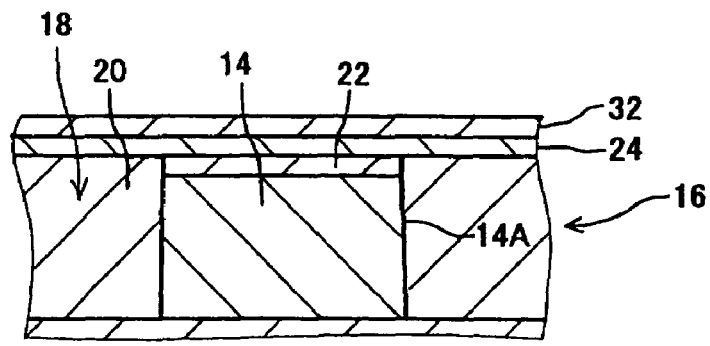
FIG. 2 is an enlarged sectional side view showing the configuration of a recording element in the magnetic recording medium.

The magnetic recording layer 10 is characterized in that the intermediate layer 22 and the protective layer 24 are made of different materials. As shown enlarged in FIG. 2, the magnetic recording layer 10 is also characterized in that the sides 14A of the recording elements 14 are shaped generally perpendicular to the surface.

Note that an underlayer 26 and a seed layer 30 are formed in this order over the substrate 12. The recording layer 16 of the concavo-convex pattern is formed on the seed layer 30. A lubricating layer 32 is also formed on the protective layer 24.

The substrate 12 is made of glass. The substrate 12 may also be made of such materials as Al (aluminum) and $Al_2O_3$ (alumina), as long as the materials have high rigidity and are nonmagnetic. The underlayer 26 is made of a Cr alloy. The seed layer 30 is made of a Cr alloy, Ru, or the like.

The recording layer 16 has a thickness of 5 to 25 nm, and is made of a CoCr (cobalt-chromium) alloy. The recording elements 14, in data regions, are formed concentrically at fine pitches in the radial direction of the magnetic recording medium 10. In servo regions, the recording elements 14 are patterned to predetermined servo information or the like.

The filler 20 fills the concave portions 18 between the recording elements 14 almost completely. The filler 20 is chiefly made of $SiO_2$ (silicon dioxide), which is an amorphous material having no crystal boundary. Incidentally, a microcrystalline material may be used for the filler 20. The surface of the filler 20 generally coincides with that of the intermediate layer 22, and the intermediate layer 22 and the filler 20 are flattened at the top.

The intermediate layer 22 has a thickness of 1 to 10 nm, and is made of Si (silicon). The protective layer 24 has a thickness of 1 to 5 nm, and is a film of hard carbon called diamond-like carbon. As employed herein, the term "diamond-like carbon" (hereinafter, referred to as "DLC") shall refer to a material that is chiefly made of carbon, has an amorphous structure, and exhibits a hardness of the order of $2 \times 10^9$ to $8 \times 10^{10}$ Pa in Vickers hardness measurement. The lubricating layer 32 has a thickness of 1 to 2 nm, and is made of PFPE (perfluoropolyether).

Now, description will be given of the operation of the magnetic recording medium 10.

The magnetic recording layer 10 is configured so that the sides 14A of the recording elements 14 are generally perpendicular to the surface. Consequently, even when the recording elements 14 are at small pitches, the concave portions 18 can surely isolate the recording elements 14 from each other. It is therefore possible to suppress the problem of accidental recording of information onto other tracks adjacent to the intended track, and the problem of crosstalk. This allows higher areal density and favorable magnetic characteristics.

In the magnetic recording medium 10, the recording elements 14 are protected doubly by the intermediate layer 22 made of silicon, a relatively hard material, and the protective layer 24 made of DLC, an even harder material. Besides, the intermediate layer 22 and the protective layer 24 have different hardnesses. Then, even if a crack or the like occurs in one of the layers, it is less likely to propagate to the other. Consequently, the recording layer 16 is surely isolated from the air and the like, so that favorable magnetic characteristics are obtained with reliability.

In addition, the intermediate layer 22 and the protective layer 24 hardly exfoliate since silicon and DLC have the property of adhering to each other tightly. Even in this respect, the recording layer 16 is surely isolated from the air and the like so that favorable magnetic characteristics are obtained with reliability.

Figure 3:
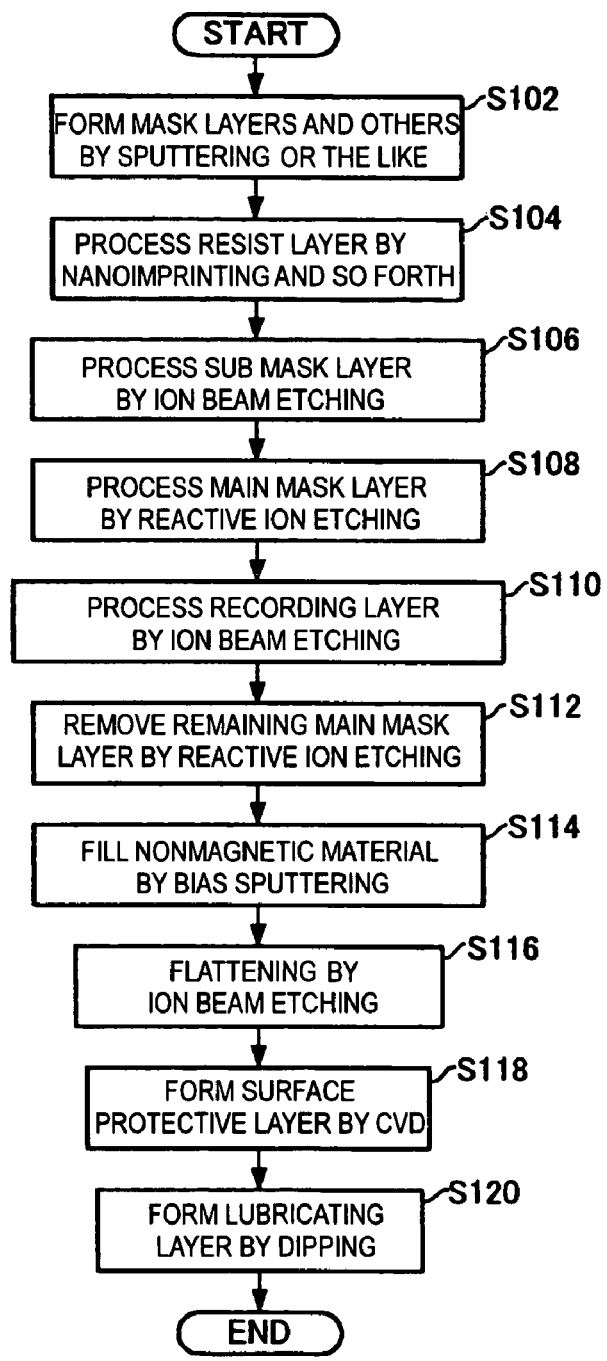
FIG. 3 is a flowchart showing the outline of the steps of manufacturing the magnetic recording medium.

Next, a method of manufacturing the magnetic recording medium 10 will be described with reference to the flowchart of FIG. 3.

Figure 4:
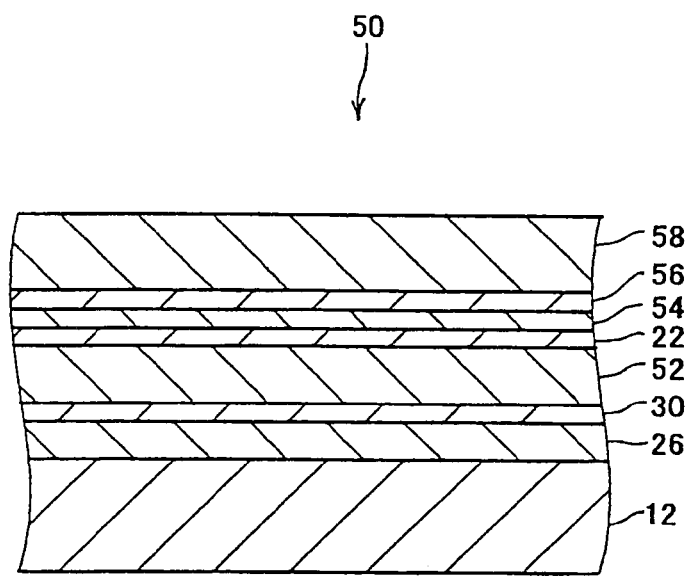
FIG. 4 is a sectional side view schematically showing the structure of the starting body of an object to be processed in the manufacturing steps.

Initially, as shown in FIG. 4, the intermediate layer 22, a main mask layer 54, a sub mask layer 56, and the like are formed over the substrate 12 to manufacture the starting body of an object to be processed 50 (S102). Specifically, the underlayer 26, the seed layer 30, a continuous recording layer 52 (to-be-etched layer), the intermediate layer 22, the main mask layer 54, and the sub mask layer 56 are formed in this order over the substrate 12 by sputtering. A resist layer 58 is further applied thereto by spin coating. Incidentally, the resist layer 58 may be applied by dipping.

The continuous recording layer 52 is the unprocessed form of the recording layer 16. The thickness and material of the continuous recording layer 52 are the same as those of the recording layer 16.

The main mask layer 54 has a thickness of 3 to 20 nm, and is chiefly made of C (carbon). Here, the phrase "chiefly made of C" refers to a material in which the ratio of the number of C atoms to the total number of atoms constituting the material reaches or exceeds 70%.

The sub mask layer 56 has a thickness of 3 to 30 nm. The sub mask layer 56 is made of a material having an etching rate lower than that of the material of the main mask layer 54 with respect to reactive ion etching using oxygen or ozone as the reactive gas. Incidentally, the sub mask layer 56 is preferably made of a material that has an etching rate 1/50 or less that of the material of the main mask layer 54 with respect to the reactive ion etching using oxygen or ozone as the reactive gas. The specific examples of the material available for the sub mask layer 56 include Ni, Ta, Ti, and other metals, Si, TaSi, and oxides and nitrides thereof. As employed herein, "TaSi" is not limited to the compound of Ta and Si, but shall cover mixtures and alloys of Ta and Si. The specific examples of TaSi include mixtures or alloys having a ratio of number of atoms which is Ta:Si=80%:20%. All of the named examples Ni, Ta, Ti, Si, and TaSi are preferable materials since they have etching rates 1/50 or less that of carbon, or the main mask layer 54, with respect to the reactive ion etching using oxygen or ozone as the reactive gas as mentioned above. Ni is particularly preferable since it has a high etching rate for ion beam etching and thus is high in workability, and the resist layer for processing Ni (sub mask layer 56) can be formed thinner.

Moreover, when the sub mask layer 56 is made of a material having an amorphous structure, it is possible to reduce fluctuations of the pattern edges of the mask pattern. Si, TaSi, and the like are preferable since they can be deposited in an amorphous state. The resist layer 58 has a thickness of 10 to 100 nm. The type of the resist layer 58 is not limited in particular. Either of negative and positive types may be used. Either of laser-beam sensitive type and electron-beam sensitive type may be used. The specific examples of the material available for the resist layer 58 include a negative type resist NBE22A from Sumitomo Chemical Co., Ltd.

Figure 5:
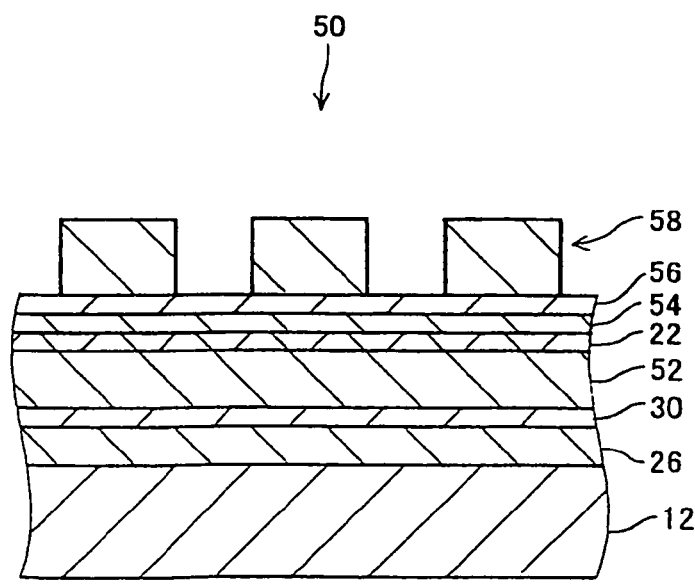
FIG. 5 is a sectional side view schematically showing the configuration of the object to be processed in which a resist layer is processed into a concavo-convex pattern.

Next, by using a transfer system (not shown), a concavo-convex pattern is transferred to the resist layer 58 over the starting body of this object to be processed 50 by nanoimprinting. The resist layer 58 is thus processed into the concavo-convex pattern corresponding to the pattern of the servo information and the like in the servo regions and the pattern of the tracks in the data regions (S104). Moreover, the resist layer 58 is processed uniformly by such means as reactive ion etching using oxygen or ozone as the reactive gas. This removes parts of the resist layer 58 under the bottoms of the concave portions in the concavo-convex pattern as shown in FIG. 5. Incidentally, the concavo-convex pattern may be formed by exposing and developing the resist layer 58 by lithographic techniques.

Figure 6:
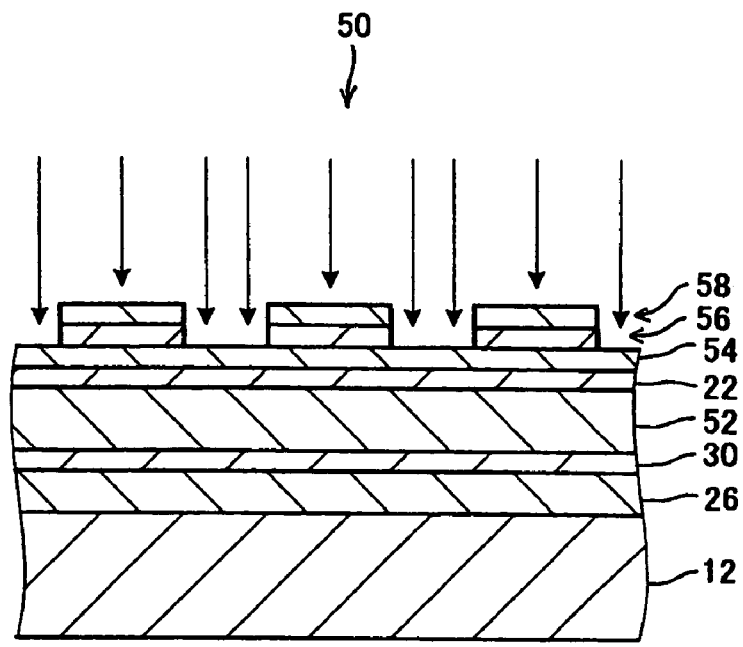
FIG. 6 is a sectional side view schematically showing the configuration of the object to be processed in which a sub mask layer is processed into a concavo-convex pattern.

Next, as shown in FIG. 6, parts of the sub mask layer 56 under the bottoms of the concave portions are removed by ion beam etching using Ar gas or other noble gas as the processing gas. The sub mask layer 56 is thus processed into the concavo-convex pattern (S106). Here, as schematically shown by the arrows in FIG. 6, the processing gas is applied to the surface of the object to be processed 50 perpendicularly. As employed herein, the term "ion beam etching" shall collectively refer to any processing method, such as ion milling, in which ionized processing gas is applied to the object to be processed to remove a matter to be processed.

Figure 7:
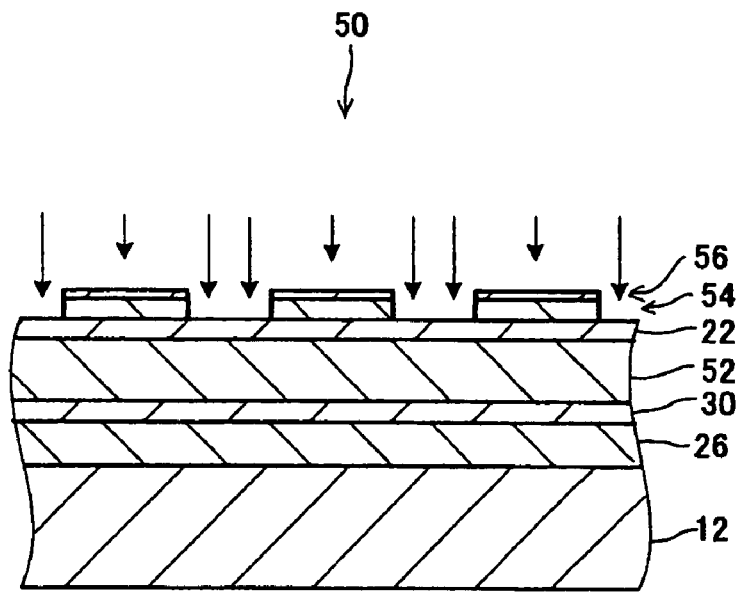
FIG. 7 is a sectional side view schematically showing the configuration of the object to be processed in which a main mask layer is processed into a concavo-convex pattern.

Next, as shown in FIG. 7, parts of the main mask layer 54 under the bottoms of the concave portions are removed by reactive ion etching using oxygen or ozone as the reactive gas (S108). For enhanced reactivity, oxygen or ozone plasma is used here. Carbon is quickly oxidized by the oxygen or ozone plasma so that the parts of the main mask layer 54 under the bottoms of the concave portions are removed in a short time. Incidentally, the oxygen or ozone plasma exerts an isotropic etching action on carbon. In the meantime, a bias power is applied to the object to be processed 50 so that the oxygen or ozone plasma impinges on the surface of the object to be processed perpendicularly as schematically shown by the arrows in FIG. 7. Consequently, the main mask layer 54 (carbon) undergoes an etching action in the direction perpendicular to the surface of the object to be processed. The isotropic etching action mentioned above and the etching action in the direction perpendicular to the surface of the object to be processed yield a synergistic effect to process the sides of the convex portions of the main mask layer 54 into generally perpendicular shapes. Incidentally, the intermediate layer 22 has a low etching rate with respect to the reactive ion etching using oxygen or ozone as the reactive gas. Thus, most of the intermediate layer 22 will not be removed but remain on the bottoms of the concave portions.

Figure 8:
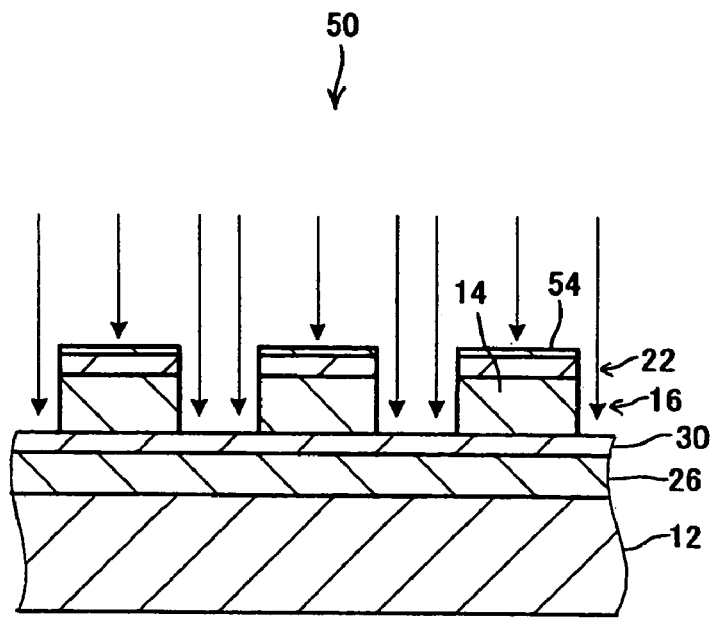
FIG. 8 is a sectional side view schematically showing the configuration of the object to be processed in which a recording layer is processed into a concavo-convex pattern.

Next, as shown in FIG. 8, parts of the intermediate layer 22 and the continuous recording layer 52 under the bottoms of the concave portions are removed by ion beam etching using Ar gas or other noble gas as the processing gas (S110). This divides the continuous recording layer 52 into a number of recording elements 14, whereby the recording layer 16 having a concavo-convex pattern is formed. Here, as schematically shown by the arrows in FIG. 8, the ion beam impinges on the surface of the object to be processed 50 perpendicularly. The ion beam etching is performed until the concave portions 18 reach the side of the continuous recording layer 52 closer to the substrate 12. Consequently, the sides of the recording elements 14 are shaped generally perpendicular to the surface.

Figure 9:
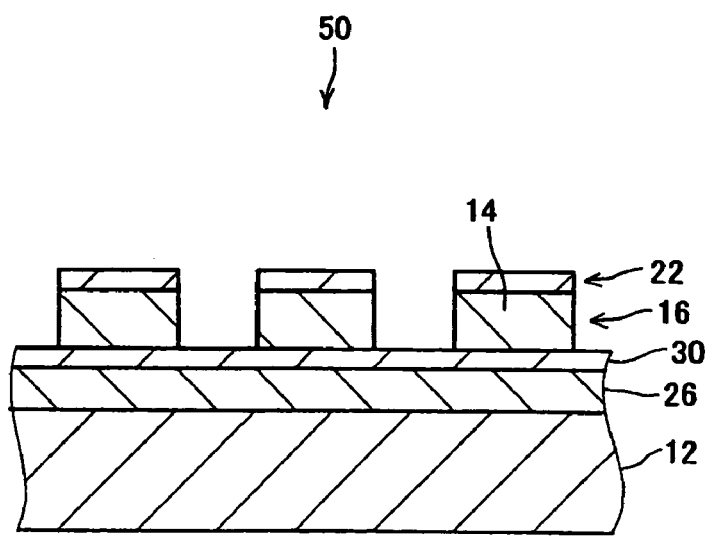
FIG. 9 is a sectional side view schematically showing the step of removing the remaining main mask layer.

Next, as shown in FIG. 9, the main mask layer 54 remaining over the recording elements 14 is removed by reactive ion etching using oxygen or ozone as the reactive gas (S112). Here, the main mask layer 54 is removed so that the intermediate layer 22 remains on the recording elements 14 (the convex portions of the to-be-etched layer).

Figure 10:
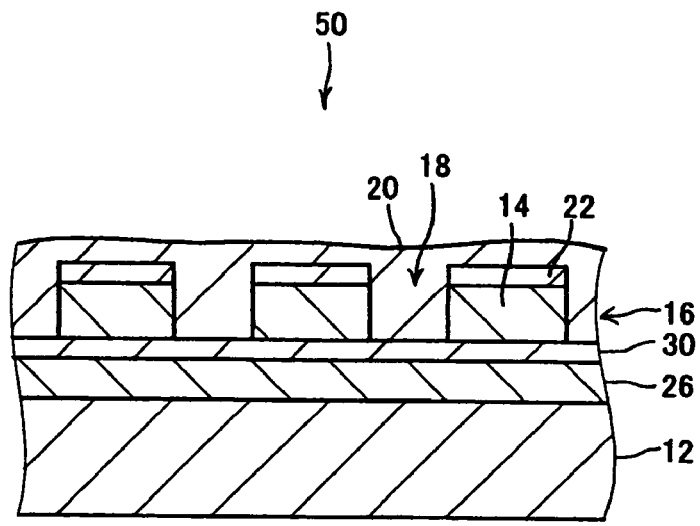
FIG. 10 is a sectional side view schematically showing the configuration of the foregoing object to be processed having a filler deposited thereon.

Next, as shown in FIG. 10, bias sputtering is performed to deposit $SiO_2$ particles (filler 20) on the surface of the object to be processed 50 while applying a bias power to the object to be processed 50. As a result, the concave portions 18 between the recording elements 14 are filled up (S114). Here, the filler 20 is deposited so as to cover the recording elements 14 completely.

During the deposition of the filler 20, Ar or other sputtering gas impinges on an $SiO_2$ target to scatter $SiO_2$ particles. Since the particles tend to deposit on the surface of the object to be processed 50 uniformly along the concavo-convex configuration of the recording elements, the filler 20 may have a surface of concavo-convex shape. On the other hand, when a bias power is applied to the object to be processed 50, the sputtering gas is biased toward the object to be processed 50 to impinge on the deposition of $SiO_2$, thereby etching some of the $SiO_2$ deposition. This etching action tends to remove protruding areas of the $SiO_2$ deposition faster than the other areas selectively, whereby the concavo-convex surface of the filler 20 is flattened gradually. In fact, these actions proceed simultaneously. Since the depositing action exceeds the etching action, the deposition of the filler 20 proceeds while the surface asperities are suppressed smaller. Consequently, the filler 20 is deposited into a surface of suppressed asperities.

Figure 11:
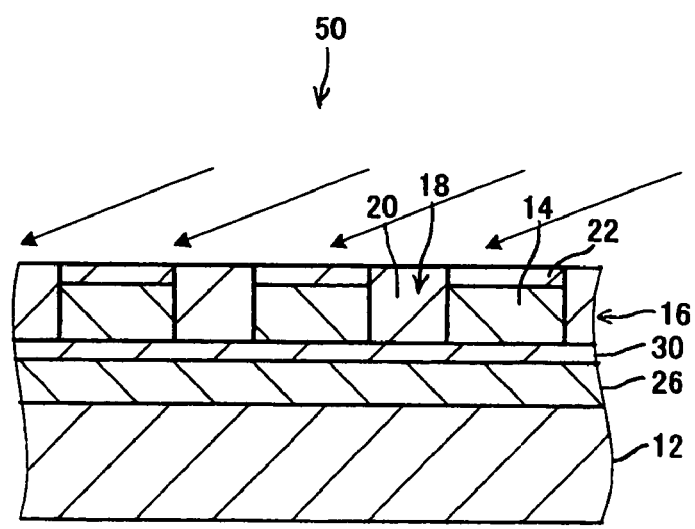
FIG. 11 is a sectional side view schematically showing the step of flattening the object to be processed.
Figure 12:
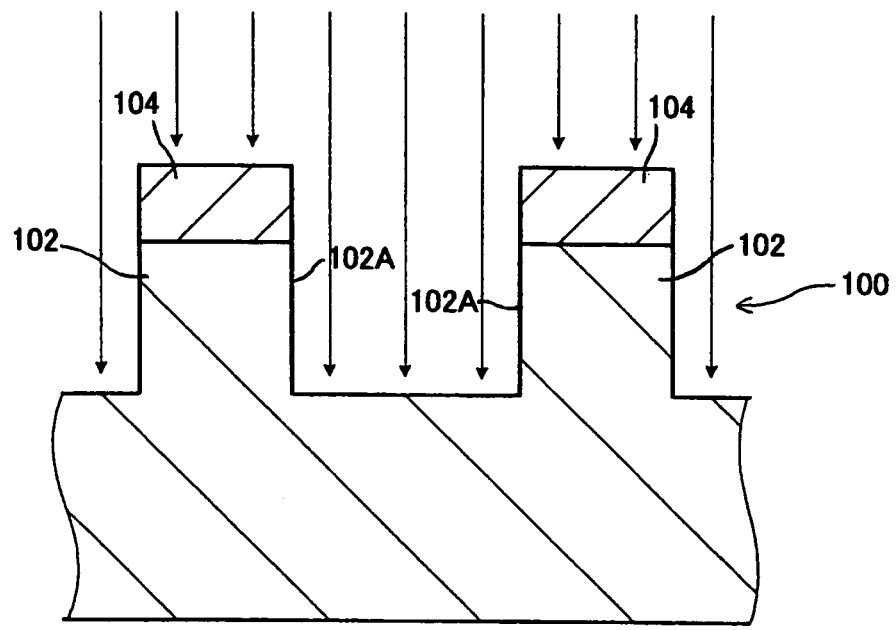
FIG. 12 is a sectional side view schematically showing convex portions of a to-be-etched layer, having sides perpendicular to the surface.
Figure 13:
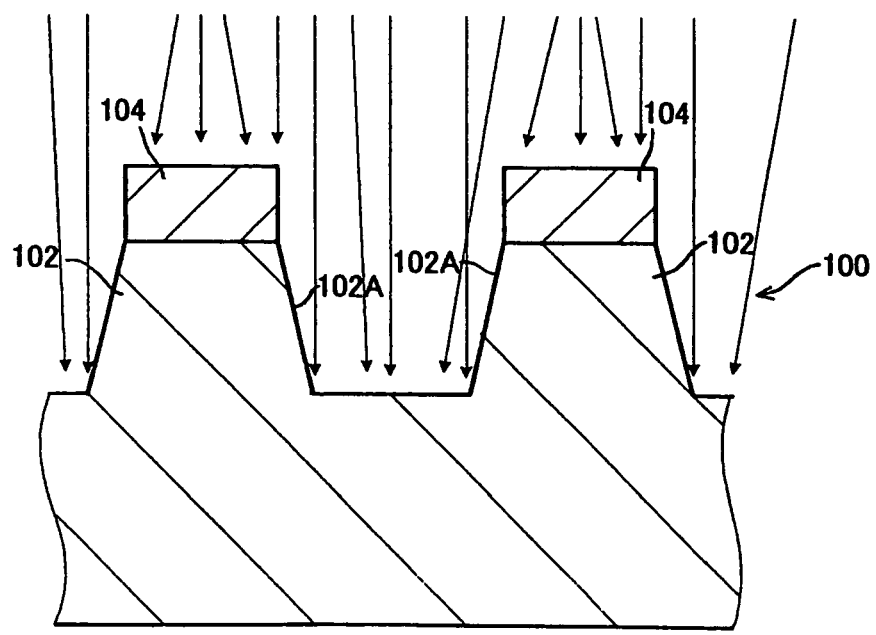
FIG. 13 is a sectional side view schematically showing the process of forming side-tilted convex portions of a to-be-etched layer by conventional dry etching.

Next, as shown in FIG. 11, the filler 20 is removed up to the top surface of the intermediate layer 22 by ion beam etching using Ar gas or other noble gas as the processing gas. This flattens the intermediate layer 22 and the filler 20 at the surface (S116). Here, as schematically shown by the arrows in FIG. 11, the processing gas can be applied to the surface in a tilted direction for the sake of improved flattening effect.

Next, the protective layer 24 is formed over the top surfaces of the intermediate layer 22 and the filler 20 by CVD (Chemical Vapor Deposition) (S118). The protective layer 24 made of DLC adheres tightly to the intermediate layer 22 made of silicon. In addition, the lubricating layer 32 is applied onto the protective layer 24 by dipping (S120). As a result, the magnetic recording medium 10 shown in FIGS. 1 and 2 seen above is completed.

As described above, the main mask layer 54 is chiefly made of carbon, and it can be processed in a short time by the reactive ion etching using oxygen or ozone as the reactive gas. The sub mask layer 56 and the resist layer 58 over the main mask layer 54 can thus be made thinner. Since the sub mask layer and the resist layer have smaller thicknesses, the taper angle of the sides of the convex portions of the main mask layer itself can be suppressed smaller. It is therefore possible to transfer the concavo-convex pattern of the outermost layers, or the resist layer 58 and the sub mask layer 56, to the main mask layer 54 and the recording layer 16 with high precision.

Moreover, since the resist layer 58 need not have a great thickness, the resist layer 58 can be processed into the concavo-convex pattern without causing much deformation or collapse of the convex portions. Even in this respect, it is possible to transfer the concavo-convex pattern of the resist layer 58 to the main mask layer 54 and the recording layer 16 with high precision.

Since the material of the main mask layer 54, carbon, has a low etching rate with respect to the ion beam etching, the main mask layer 54 can be made accordingly thinner. Consequently, the sides of the recording elements 14 can be shaped generally perpendicular to the surface.

Moreover, the recording elements 14 are formed by the ion beam etching in which a processing gas has high directivity. Even in this respect, the sides of the recording elements 14 can be shaped generally perpendicular to the surface.

Since the intermediate layer 22 is formed between the continuous recording layer 52 and the main mask layer 54, it is possible to protect the top surfaces of the recording elements 14 from the processing of removing the main mask layer 54. Moreover, in the step of removing the main mask layer 54 (S112), the main mask layer 54 on the intermediate layer 22 is removed so that the intermediate layer 22 remains on the top surfaces of the recording elements 14. Thus, even after the processing, the top surfaces of the recording elements 14 are isolated from the air and the like. It is therefore possible to prevent deterioration in magnetic characteristics ascribable to oxidation and corrosion.

In the present exemplary embodiment, the intermediate layer 22 is made of Si. Nevertheless, the intermediate layer 22 may be made of other nonmagnetic materials as long as they have low etching rates with respect to the dry etching for removing the main mask layer 54. In order to protect the top surfaces of the recording elements 14 sufficiently from the dry etching for removing the main mask layer 54, the intermediate layer 22 preferably has an etching rate no higher than $1/5$ that of the material of the main mask layer 54, or carbon, with respect to the dry etching for removing the main mask layer 54. Etching rates of $1/10$ and less are more preferable.

If the thickness of the intermediate layer 22 deposited is too small, the intermediate layer 22 may fail to form a continuous uniform film. The intermediate layer 22 is thus preferably deposited in a thickness of 1 nm or greater. Meanwhile, if the thickness of the intermediate layer 22 remaining after the removal of the main mask layer 54 is too large, excessive spacing loss can occur between the recording elements 14 and the head, with deterioration in the recording and reproducing characteristics. Thus, the intermediate layer 22 over the recording elements 14 is preferably given a thickness of 10 nm or less.

In the present exemplary embodiment, the intermediate layer 22 is formed between the continuous recording layer 52 and the main mask layer 54. Nevertheless, when the top surfaces of the recording elements 14 are less likely to deteriorate during the processing of removing the main mask layer 54 over the recording elements 14, the intermediate layer 22 may be omitted so that the main mask layer 54 is formed directly on the continuous recording layer 52.

In the present exemplary embodiment, the main mask layer 54 remaining over the recording elements 14 is removed by the reactive ion etching using oxygen or ozone as the reactive gas. Nevertheless, the dry etching to be used in the step of removing the main mask layer 54 (S112) is not limited to any particular type as long as it can remove the main mask layer 54 over the recording elements 14.

While the present exemplary embodiment has the step of removing the main mask layer 54 (S112), the step of removing the main mask layer 54 may be omitted if most of the main mask layer 54 over the recording elements 14 can be removed in the step of processing the recording layer 16 into the concavo-convex pattern (S110).

In the present exemplary embodiment, the resist layer 58 is formed on the sub mask layer 56, and the sub mask layer 56 is processed into the concavo-convex pattern by ion beam etching. Nevertheless, the processing method is not particularly limited as long as the sub mask layer 56 can be processed into a desired concavo-convex pattern. For example, another mask layer may be formed between the sub mask layer 56 and the resist layer, so that the sub mask layer 56 is processed into the concavo-convex pattern through two or more stages of dry etching.

In the present exemplary embodiment, the recording layer 16 (the continuous recording layer 52) is made of a CoCr alloy. Nevertheless, the present invention may also be applied to a magnetic recording medium which has recording elements made of other materials including other alloys containing iron-group elements (Co, Fe (iron), and Ni) and laminates thereof.

In the present exemplary embodiment, the filler 20 is made of $SiO_2$. Nevertheless, other nonmagnetic materials may also be used, including other oxides, nitrides such as TiN (titanium nitride), carbides such as SiC (silicon carbide) and TiC (titanium carbide), Ta (tantalum), TaSi, and Si. In particular, nonmagnetic materials such as oxides, nitrides, and carbides have excellent chemical stabilities by themselves, as well as excellent chemical stabilities against corrosion and the like ascribable to contact with the recording layer 16 which is made of a metal magnetic material. This allows accordingly superior recording and reproducing characteristics.

For the sake of filling defects in the sides of the recording elements 14 and enhancing the effect of suppressing the occurrence of voids, the filler 20 is preferably made of an amorphous material having no crystal boundary or a microcrystalline material. As employed herein, the "microcrystalline material" shall refer to a material that shows no crystalline peak in X-ray diffraction.

In the present exemplary embodiment, the underlayer 26 and the seed layer 30 are formed under the recording layer 16. Nevertheless, the configuration of the layers under the recording layer 16 may be modified as appropriate according to the type of the magnetic recording medium. For example, either one of the underlayer 26 and the seed layer 30 may be omitted. The layers may be made of a plurality of layers each. The recording layer may be formed directly on the substrate.

In the present exemplary embodiment, the magnetic recording medium 10 is a magnetic disk of longitudinal recording type, having data regions in which the recording elements 14 are arranged at small intervals in the radial direction of the tracks. However, the present invention may be also applicable to other magnetic disks such as: a magnetic disk in which the recording elements are arranged at small intervals in the circumferential direction of the tracks (in the sector direction); a magnetic disk in which the recording elements are arranged at small intervals both in the radial direction and the circumferential direction of the tracks; a magnetic disk of PERM (Pre-Embossed Recording Medium) type, having a continuous recording layer provided with a concavo-convex pattern; and a magnetic disk having a track of spiral configuration. Moreover, the present invention may be applied to a magnetic disk of perpendicular recording type. In addition, the present invention may also be applied to magneto-optic disks, such as an MO, magnetic disks of thermally assisted type in which both magnetism and heat are used, and magnetic recording media having a recording layer of concave-convex pattern other than ones having a disk-like configuration, such as a magnetic tape.

The present exemplary embodiment has dealt with a magnetic recording medium, in which the main mask layer 54 chiefly made of carbon is processed into a concavo-convex pattern by reactive ion etching using oxygen or ozone as the reactive gas, and the continuous recording layer 52, or to-be-etched layer, is processed into a concavo-convex pattern based on the concavo-convex pattern of the main mask layer 54. Nevertheless, this method of dry etching may also be applied to the fields of other information recording media, such as an optical recording medium, semiconductors, and the like. Even in those applications, it is possible, as in the present exemplary embodiment, to process a to-be-etched layer into a desired concavo-convex pattern with high precision.

WORKING EXAMPLE

In accordance with the foregoing exemplary embodiment, a continuous recording layer 52 of a CoCr alloy was deposited to a thickness of approximately 20 nm.

Moreover, an intermediate layer 22 of Si, a main mask layer 54 of C, and a sub mask layer 56 of Ni were deposited over the continuous recording layer 52 to thicknesses of approximately 2 nm, 15 nm, and 3 nm, respectively, by sputtering. A resist layer 58 made of an electron beam resist was deposited on the sub mask layer 56 to a thickness of approximately 20 nm by spin coating.

Next, by nanoimprinting and reactive ion etching using oxygen as the reactive gas, the resist layer 58 was processed into a concavo-convex pattern in which lines (convex portions) and spaces (concave portions) are laid at pitch of approximately 200 nm with a line-to-space ratio of approximately 1:1. Parts of the sub mask layer 56 under the bottoms of the concave portions of this concavo-convex pattern were removed by ion beam etching using Ar gas, whereby the sub mask layer 56 was processed into a concavo-convex pattern. Moreover, parts of the main mask layer 54 under the bottoms of the concave portions of this concavo-convex pattern were removed by reactive ion etching using oxygen as the reactive gas, whereby the main mask layer 54 was processed into a concavo-convex pattern. Here, the source power was set at RF 1000 W. A bias power of RF 75 W was applied to the object to be processed.

Next, parts of the intermediate layer 22 and the continuous recording layer 52 under the bottoms of the concave portions of this concavo-convex pattern were removed by ion beam etching using Ar gas, whereby a recording layer 16 having a concavo-convex pattern was formed. Incidentally, the main mask layer 54 remaining over the recording elements 14 was removed by reactive ion etching using oxygen as the reactive gas. This process was conducted until the top surface of the intermediate layer 22 was exposed. The main mask layer 54 was thus removed completely. The source power was set at RF 1000 W. No bias power was applied to the object to be processed.

The magnetic characteristics of the recording layer 16 obtained thus were compared with those of an unprocessed continuous recording layer 52. Specifically, the two samples were measured for saturation magnetization Ms by using VSM (Vibrating Sample Magnetometer). Both showed Ms of approximately 0.44 $Wb/m^2$. In VSM, the two samples were also measured for coercivity Hc. Both showed Hc of approximately 300 kA/m. That is, no difference was observed between the magnetic characteristics of the two samples. This confirms that the method of dry etching according to the foregoing exemplary embodiment can be used to process the continuous recording layer 52 into a concavo-convex pattern while preventing the magnetic characteristics of the recording elements 14 from deteriorating during the processing.

It was also observed that the sides of the recording elements 14 were tilted from the direction perpendicular to the surface, by approximately 10° toward the surface. That is, the tilt angle of the sides of the recording elements 14 were suppressed to approximately 10°, i.e., shaped close to the desired shape.

The present invention may be applied to the manufacturing of an information recording medium such as a magnetic recording medium, the manufacturing of a semiconductor or the like.

What is claimed is:

1. A method of dry etching, comprising:
   a mask layer forming step of forming a main mask layer and a sub mask layer in this order over a to-be-etched layer;
   a sub mask layer processing step of processing the sub mask layer into a predetermined concavo-convex pattern;
   a main mask layer processing step of removing parts of the main mask layer under concave portions of the concavo-convex pattern by reactive ion etching using at least either one of oxygen and ozone as a reactive gas; and
   a to-be-etched layer processing step of removing parts of the to-be-etched layer under the concave portions of the concavo-convex pattern by dry etching, thereby shaping the to-be-etched layer into the concavo-convex pattern, wherein
   the main mask layer is made of a material in which a ratio of a number of carbon atoms to a total number of atoms constituting the material of the main mask layer is 70% or more, the sub mask layer is made of a material selected from the group consisting of Ni, Ta, Ti, Si, TaSi and mixtures thereof, and
   the sub mask layer has an etching rate lower than that of the material of the main mask layer with respect to the reactive ion etching in the main mask layer processing step.

2. A method of manufacturing a magnetic recording medium, wherein by using the method of dry etching according to claim 1 a recording layer is processed, as the to-be-etched layer, into the concavo-convex pattern.

3. The method of dry etching according to claim 1, wherein the sub mask layer is made of Ni, and the sub mask layer is processed into the predetermined concavo-convex pattern by dry etching using noble gas in the sub mask layer processing step.

4. The method of dry etching according to claim 1, wherein the main mask layer is formed in contact with the to-be-etched layer in the mask layer forming step.

5. The method of dry etching according to claim 1, wherein:
   in the mask layer forming step, a resist layer is formed over the sub mask layer;
   a resist layer processing step of processing the resist layer into the concavo-convex pattern is interposed between the mask layer forming step and the sub mask layer processing step; and
   in the sub mask layer processing step, parts of the sub mask layer under concave portions of the concavo-convex pattern is removed.

6. A method of manufacturing a magnetic recording medium, wherein by using the method of dry etching according to claim 5 a recording layer is processed, as the to-be-etched layer, into the concavo-convex pattern.

7. The method of dry etching according to claim 1, wherein:
   the to-be-etched layer processing step is followed by a main mask layer removing step of removing the main mask layer remaining over convex portions of the to-be-etched layer by reactive ion etching using at least either one of oxygen and ozone as a reactive gas; and
   in the mask layer forming step, an intermediate layer made of a material having an etching rate lower than that of the material of the main mask layer with respect to the reactive ion etching in the main mask layer removing step is formed between the to-be-etched layer and the main mask layer.

8. A method of manufacturing a magnetic recording medium, wherein by using the method of dry etching according to claim 7 a recording layer is processed, as the to-be-etched layer, into the concavo-convex pattern.

9. The method of dry etching according to claim 7, wherein:
   in the mask layer forming step, a resist layer is formed over the sub mask layer;
   a resist layer processing step of processing the resist layer into the concavo-convex pattern is interposed between the mask layer forming step and the sub mask layer processing step; and
   in the sub mask layer processing step, parts of the sub mask layer under concave portions of the concavo-convex pattern is removed.

10. The method of dry etching according to claim 7, wherein the main mask layer is formed in contact with the intermediate layer in the mask layer forming step.

11. The method of dry etching according to claim 7, wherein
   in the main mask layer removing step, the main mask layer is removed so that the intermediate layer remains over the convex portions of the to-be-etched layer.

12. The method of dry etching according to claim 11, wherein:
   in the mask layer forming step, a resist layer is formed over the sub mask layer;
   a resist layer processing step of processing the resist layer into the concavo-convex pattern is interposed between the mask layer forming step and the sub mask layer processing step; and
   in the sub mask layer processing step, parts of the sub mask layer under concave portions of the concavo-convex pattern is removed.

13. A method of manufacturing a magnetic recording medium, wherein by using the method of dry etching according to claim 11 a recording layer is processed, as the to-be-etched layer, into the concavo-convex pattern.

14. The method of dry etching according to claim 1, wherein
   in the to-be-etched layer processing step, the to-be-etched layer is processed into the concavo-convex pattern by ion beam etching.

15. The method of dry etching according to claim 14, wherein:
   in the mask layer forming step, a resist layer is formed over the sub mask layer;
   a resist layer processing step of processing the resist layer into the concavo-convex pattern is interposed between the mask layer forming step and the sub mask layer processing step; and
   in the sub mask layer processing step, parts of the sub mask layer under concave portions of the concavo-convex pattern is removed.

16. A method of manufacturing a magnetic recording medium, wherein by using the method of dry etching according to claim 14 a recording layer is processed, as the to-be-etched layer, into the concavo-convex pattern.

17. The method of dry etching according to claim 1, wherein:
   the to-be-etched layer processing step is followed by a main mask layer removing step of removing the main mask layer remaining over convex portions of the to-beetched layer by reactive ion etching using at least either one of oxygen and ozone as a reactive gas; and in the mask layer forming step, an intermediate layer made of a material having an etching rate lower than that of the material of the main mask layer with respect to the reactive ion etching in the main mask layer removing step is formed between the to-be-etched layer and the main mask layer.

18. The method of dry etching according to claim 17, wherein:

in the mask layer forming step, a resist layer is formed over the sub mask layer;

a resist layer processing step of processing the resist layer into the concavo-convex pattern is interposed between the mask layer forming step and the sub mask layer processing step; and in the sub mask layer processing step, parts of the sub mask layer under concave portions of the concavo-convex pattern is removed.

19. The method of dry etching according to claim 17, wherein in the main mask layer removing step, the main mask layer is removed so that the intermediate layer remains over the convex portions of the to-be-etched layer.

20. The method of dry etching according to claim 19, wherein:

in the mask layer forming step, a resist layer is formed over the sub mask layer;

a resist layer processing step of processing the resist layer into the concavo-convex pattern is interposed between the mask layer forming step and the sub mask layer processing step; and in the sub mask layer processing step, parts of the sub mask layer under concave portions of the concavo-convex pattern is removed.

* * * * *